United States Patent
Szczeszynski

(10) Patent No.: US 12,003,174 B2
(45) Date of Patent: Jun. 4, 2024

(54) POLE COMPENSATION IN RECONFIGURABLE POWER CONVERTER

(71) Applicant: pSemi Corporation, San Diego, CA (US)

(72) Inventor: Gregory Szczeszynski, Nashua, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 18/152,838

(22) Filed: Jan. 11, 2023

(65) Prior Publication Data

US 2023/0353047 A1 Nov. 2, 2023

Related U.S. Application Data

(63) Continuation of application No. 17/006,039, filed on Aug. 28, 2020, now Pat. No. 11,581,805, which is a continuation of application No. 16/139,507, filed on Sep. 24, 2018, now Pat. No. 10,790,741.

(51) Int. Cl.
*H02M 3/07* (2006.01)
*H02M 1/42* (2007.01)
*H02M 1/00* (2006.01)

(52) U.S. Cl.
CPC .............. *H02M 3/07* (2013.01); *H02M 1/42* (2013.01); *H02M 1/0003* (2021.05)

(58) Field of Classification Search
None
See application file for complete search history.

(56) References Cited

U.S. PATENT DOCUMENTS

| | | | |
|---|---|---|---|
| 6,960,904 B2 | 11/2005 | Matsuura | |
| 7,521,907 B2 * | 4/2009 | Cervera | H02M 3/157 323/275 |
| 7,759,912 B2 | 7/2010 | Weng | |
| 7,782,027 B2 * | 8/2010 | Williams | H02M 3/07 363/60 |
| 8,810,221 B2 * | 8/2014 | Hunt | H02M 3/156 323/283 |
| 8,907,643 B2 * | 12/2014 | Sreenivas | H02M 3/157 323/273 |
| 9,136,756 B2 * | 9/2015 | Liu | H02M 3/07 |
| 9,203,347 B2 | 12/2015 | Jiang | |
| 9,557,757 B2 | 1/2017 | Potanin | |
| 9,678,521 B2 | 6/2017 | Liu | |
| 9,812,952 B2 | 11/2017 | Huang | |
| 10,305,377 B2 | 5/2019 | Cherniak | |
| 10,376,301 B2 | 8/2019 | Heckel | |
| 10,418,898 B2 * | 9/2019 | Cho | H02M 1/08 |
| 10,790,741 B2 * | 9/2020 | Szczeszynski | H02M 3/156 |
| 11,581,805 B2 * | 2/2023 | Szczeszynski | H02M 3/07 |

(Continued)

*Primary Examiner* — Thomas J. Hiltunen
(74) *Attorney, Agent, or Firm* — Finnegan, Henderson, Farabow, Garrett & Dunner LLP

(57) ABSTRACT

In a power converter that includes a switched-capacitor circuit connected to a switched-inductor circuit, reconfiguration logic causes the switched-capacitor circuit to transition between first and second switched-capacitor configurations with different voltage-transformation ratios. A compensator compensates for a change in the power converter's forward-transfer function that would otherwise result from the transition between the two switched-capacitor configurations.

20 Claims, 5 Drawing Sheets

(56) References Cited

U.S. PATENT DOCUMENTS

| | | | |
|---|---|---|---|
| 2007/0210777 A1* | 9/2007 | Cervera | H02M 3/158 323/284 |
| 2014/0002042 A1* | 1/2014 | Wismar | H02M 3/157 323/282 |
| 2014/0125306 A1* | 5/2014 | Babazadeh | H02M 3/156 323/285 |
| 2018/0205315 A1 | 7/2018 | Giuliano | |

* cited by examiner

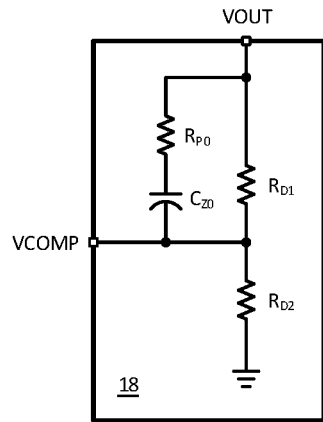
FIG. 7
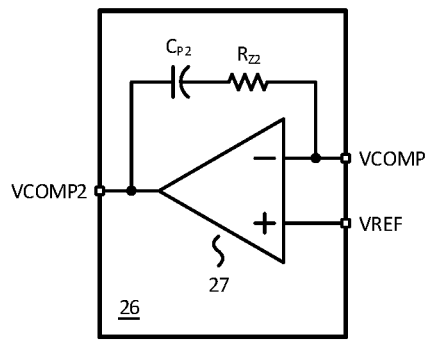 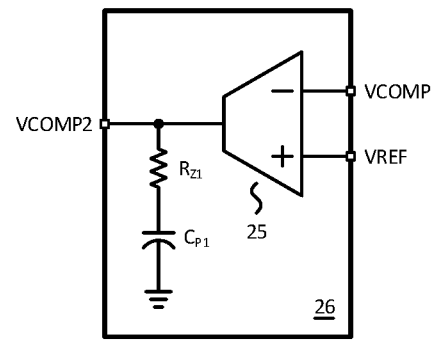
FIG. 8  FIG. 9

POLE COMPENSATION IN RECONFIGURABLE POWER CONVERTER

CROSS-REFERENCE TO RELATED APPLICATION

This application is a continuation of application Ser. No. 17/006,039, filed Aug. 20, 2020, now U.S. Pat. No. 11,581,805, issued on Feb. 14, 2023, which is a continuation of application Ser. No. 16/139,507, filed Sep. 24, 2018, now U.S. Pat. No. 10,790,741, issued on Sep. 29, 2020. The entire contents of the above-referenced applications are incorporated herein by reference.

FIELD OF DISCLOSURE

This disclosure relates to power converters, and in particular, to controlling operation of power converters.

BACKGROUND

Power converters are expected to transform a first voltage into a second voltage. In doing so, it is necessary to control the power converter to generate the correct second voltage in the presence of variation in the first voltage or in the load on the second voltage.

Control over the power converter may involve the use of feedback, thereby forming a feedback-controlled power-converter. For brevity, this will be referred to herein as a "controlled power-converter." A power converter in the absence of feedback control will be referred to herein as an "uncontrolled power-converter."

Generally, overall "closed loop" response of the controlled power-converter depends on a loop transfer-function that includes a forward transfer-function provided by the uncontrolled power-converter and a feedback transfer-function provided by one or more feedback modules. The combination of the two yields a closed-loop transfer-function of the controlled power-converter.

The proper design of the feedback module provides a way to control various properties of the power converter's operation. For example, the feedback transfer-function can be used to avoid instability or to adjust the permissible gain margin or phase margin of the overall controlled power-converter.

Needless to say, the feedback transfer-function is tightly coupled to the forward transfer-function. If the forward transfer-function changes, it is generally necessary to also change the feedback transfer-function to maintain desired characteristics of the controlled power-converter. This means that one cannot properly design the feedback transfer-function without some knowledge of the forward transfer-function.

Normally, this does not pose a difficulty. The forward transfer-function can be obtained experimentally or by inspecting the specification sheet provided with by a manufacturer of power converters. However, this presupposes that the forward transfer-function never changes. If it changes significantly during operation, especially if it does so in a not entirely predictable manner, one is faced with a moving target. As a result, it becomes difficult to suitably design a feedback module.

SUMMARY

In one aspect, the invention concerns reconfiguring a switched-capacitor circuit of a power converter in such a way that such reconfiguration does not necessitate reconfiguration of at least one of the compensation circuits used to control the power converter. In particular, the invention concerns reconfiguring the switched-capacitor circuit of a power converter as well a first compensation circuit thereof so as to avoid having to change a second compensation circuit thereof, thereby avoiding changing the loop transfer function that is relied upon for proper feedback design. For example, the first compensation circuit, which is reconfigured along with the power converter, may be integrated with the power converter and reconfigured by the same reconfiguration logic that reconfigures the switched-capacitor circuit. This avoids having to reconfigure an external compensation circuit.

In one aspect, the invention features a compensator and reconfiguration logic. The reconfiguration logic causes a switched-capacitor circuit that is connected to a regulator to transition between a first and second switched-capacitor configurations having corresponding first and second voltage-transformation ratios that differ from each other. This results in a change to a forward transfer function of an uncontrolled power-converter defined by the switched-capacitor circuit and the regulator. The compensator compensates for a change in the forward-transfer function that would otherwise result from the transition between the first and second switched-capacitor configurations.

In some embodiments, the reconfiguration logic reconfigures both the switched-capacitor circuit and the compensator.

In other embodiments, when the reconfiguration logic causes the switched-capacitor to be reconfigured, the reconfiguration logic also causes the compensator to be reconfigured to compensate for a change caused by reconfiguring the switched-capacitor circuit.

In yet other embodiments, the compensator includes a first compensation circuit that receives a voltage from a second compensation circuit. Among these are embodiments in which compensation is split between the first compensation circuits and a second compensation circuit that provides a signal to the first compensation circuit. Also among these are embodiments in which the second compensation circuit controls gain and phase margins of a loop transfer function.

In some embodiments, the compensator compensates for a linear component of a change in the forward-transfer function. Among these are embodiments in which the compensator includes a first compensation circuit that compensates for a linear component of a change in the forward-transfer function and that receives a voltage from a second compensation circuit that compensates for a non-linear component of the change.

In some embodiments, the compensator has a compensator transfer-function and transitions between configurations cause a zero of the compensator transfer-function to move in frequency steps.

Among these are embodiments in which, when the reconfiguration logic causes the switched-capacitor circuit to transition into the second configuration, a combination of the switched-capacitor circuit in the second configuration and the switched inductor circuit has a transfer function that has a pole that changes frequency. In such embodiments, the reconfiguration logic causes the compensator transfer-function to have a zero that chases the pole in frequency space.

Also among these are embodiments in which when the reconfiguration logic causes the switched-capacitor circuit to transition into the second configuration, a combination of the switched-capacitor circuit in the second configuration and the switched inductor circuit has a transfer function that has a pole that has a pole frequency, wherein each compensator configuration defines a gap between a zero-frequency corresponding to the configuration and the pole frequency, the zero-frequency corresponding to a frequency of a zero associated with the compensator configuration, wherein there exists a set of gaps, each of which corresponds to a difference between the pole frequency and a zero-frequency of one of the compensator configuration, and wherein the reconfiguration logic causes the compensator transfer-function to have a zero that minimizes a gap between the zero and the pole in frequency space.

Also among these embodiments are those in which when the reconfiguration logic causes the switched-capacitor circuit to transition into the second configuration, a combination of the switched-capacitor circuit in the second configuration and the switched inductor circuit has a transfer function that has a pole that changes frequency and wherein the reconfiguration logic causes the compensator transfer-function to have a zero that has the same frequency as the pole.

Some embodiments include a first die, wherein the compensator, the switched-capacitor circuit, and the reconfiguration logic are on the first die. Among these are embodiments in which the first die is configured to connect to a second die that contains a feedback module, the feedback module being configured to cooperate with the compensator to provide feedback control over the uncontrolled power-converter.

Among the embodiments are those in which the uncontrolled power-converter has a transfer function that has a first Laplace transform that changes upon reconfiguration of the switched-capacitor circuit and the compensator has a transfer function that has a second Laplace transform that changes upon reconfiguration of the compensator. In these embodiments, the reconfiguration logic attempts to cause a product of the first and second Laplace transforms to be constant.

In some embodiments, the switched-capacitor circuit has a switched-capacitor transfer function and the compensator has a compensator transfer function. In these embodiments, the second switched-capacitor configuration moves a double pole of the switched-capacitor transfer function to a lower frequency and, in response, the reconfiguration logic reconfigures the compensator to lower a zero-frequency of the compensator transfer-function.

In some embodiments, the compensator and a feedback module that provides a signal to the compensator cooperate to form an adaptive compensation circuit that dynamically responds to changes caused by reconfiguration of the switched-capacitor circuit.

A change in the forward-transfer function can result in a change in its gain, its distribution of poles and zeros, or both. Embodiments of the compensator include those that compensate for a change in a distribution of poles and zeros in the complex frequency domain of the forward-transfer function that would otherwise result from said transition between said first and second switched-capacitor configurations, or a change in the gain of the forward-transfer function that would otherwise result from said transition between said first and second switched-capacitor configurations, or a change in both the gain and the distribution of poles and zeros in the complex-frequency domain.

Also among the embodiments are those in which the regulator is implemented as a switched-inductor circuit.

Additional embodiments include a comparator that receives a compensation-circuit output from the compensation circuit and a reference signal, and that provides, to a modulator, a difference signal. The modulator then provides, to the switched-inductor circuit, a duty-cycle signal with the difference signal being indicative of a difference between the reference signal and the compensation-circuit output and the duty-cycle signal being based on the difference signal and with the duty-cycle signal causing a change in a duty cycle of a switch in the switched-inductor circuit. Among these embodiments are those in which reconfiguration logic provides the modulator with a nominal duty cycle and the modulator alters the nominal duty cycle in response to the difference signal and those in which the reconfiguration logic provides the reference signal.

DESCRIPTION OF THE DRAWINGS

These and other features and advantages of the invention will be apparent from the following detailed description and the accompanying figures, in which:

FIG. 7 shows details of an exemplary external compensation circuit from the control system shown in FIG. 1;

FIGS. 8 and 9 show implementations of an internal compensation circuit from the control system shown in FIG. 1;

DETAILED DESCRIPTION

Figure 1:
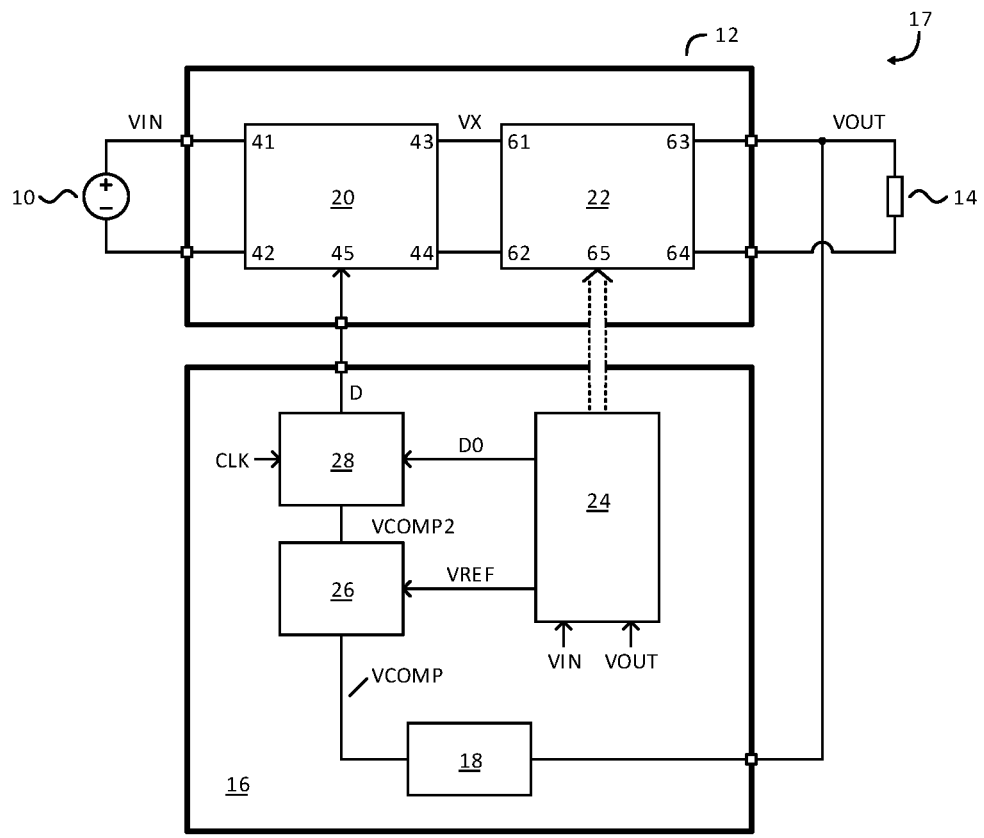
FIG. 1 shows a control system for controlling an otherwise uncontrolled step-up power converter.

FIG. 1 shows a voltage source 10 that provides an input voltage VIN to a controlled power-converter 17. The controlled power-converter 17 converts the input voltage VIN into an output voltage VOUT and makes it available to a load 14.

A feedback control-system 16 controls the operation of an uncontrolled power-converter 12 to yield the controlled power-converter 17. The uncontrolled power-converter 12 defines the forward transfer-function and the feedback control-system 16 defines its feedback transfer-function. The combination of the forward transfer-function and the feedback transfer-function defines the closed-loop transfer-function of the controlled power-converter 17.

The uncontrolled power-converter 12 includes a regulator 20 and a switched-capacitor circuit 22. The regulator 20 and the switched-capacitor circuit 22 connect to each other in series such that the regulator 20 receives the input voltage VIN and the switched-capacitor circuit 22 provides the output voltage VOUT. In this implementation, regulator 20 is a boost converter. Suitable regulators and voltage multipliers are described in detail in U.S. Pat. Nos. 8,817,501 and 9,203,299, the contents of which are herein incorporated by reference. As used herein, the term "charge pump" refers to a switched-capacitor circuit.

The switched-inductor circuit 20 receives the input voltage VIN. It then generates an intermediate voltage VX and provides that intermediate voltage VX to the switched-capacitor circuit 22. The switched-capacitor circuit 22 then transforms the intermediate voltage VX into an output voltage VOUT.

Power converters of the type shown in FIG. 1 are described in detail in U.S. Pat. No. 8,860,396, 8,743,553, 8,723,491, 8,503,203, 8,693,224, 8,724,353, 8,619,445, 9,203,299, 9,742,266, 9,041,459, U.S. Publication No. 2017/0085172, U.S. Pat. Nos. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318, the contents of which are all incorporated herein by reference.

Figure 2:
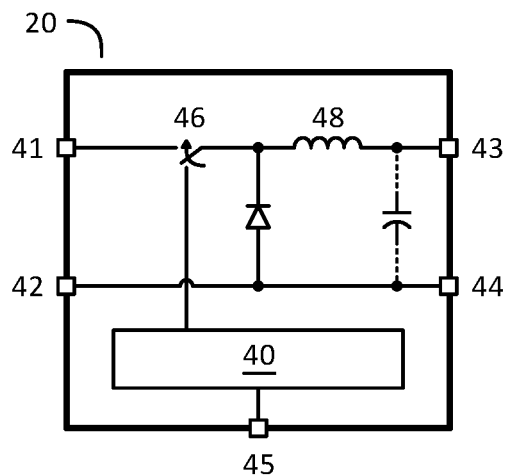
FIGS. 2-5 show regulators for use with the power converter in FIG. 1.

FIG. 2 shows the regulator 20 implemented as a switched-inductor circuit that receives an input voltage across its first and second regulator-terminals 41, 42. A switched-inductor controller 40 attempts to regulate this input voltage to provide a steady output voltage across its third and fourth regulator-terminals 43, 44. The switched-inductor controller 40 attempts to maintain a steady output voltage by changing a duty cycle of a regulator-switch 46, thereby selectively disconnecting and connecting an inductance 48.

Figure 3:
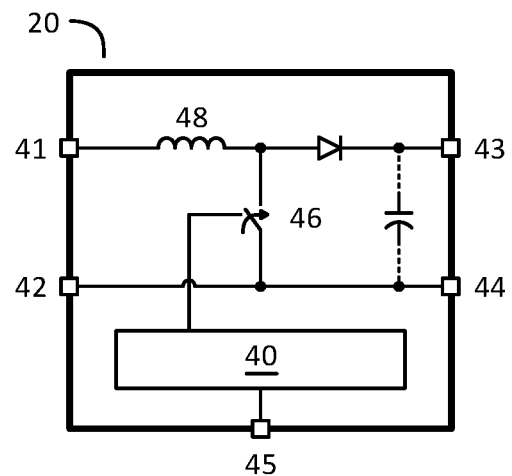
Figure 4:
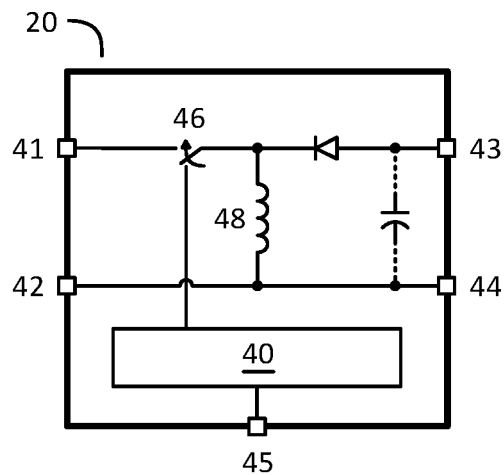
Figure 5:
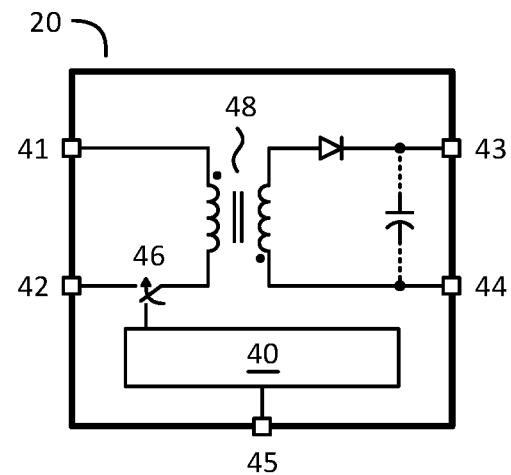

The particular embodiment shown in FIG. 2 is a buck converter. The same components but rearranged into a different topology yield a boost converter in FIG. 3 and a buck-boost converter in FIG. 4. In an alternative embodiment shown in FIG. 5, a transformer provides both the inductance 48 and galvanic isolation between the first and second regulator-terminals 41, 42 and the third and fourth regulator-terminals 43, 44. The illustrated topology in FIG. 5 defines a fly back converter. The regulators shown in FIGS. 2-5 all feature a switch 46 that selectively connects and disconnects an inductance 48, thereby enabling voltage regulation. Other suitable regulators, which are not shown, include Cuk converters, SEPIC converters, resonant converters, multi-level converters, Forward Converters, and Full-Bridge Converters.

Figure 6:
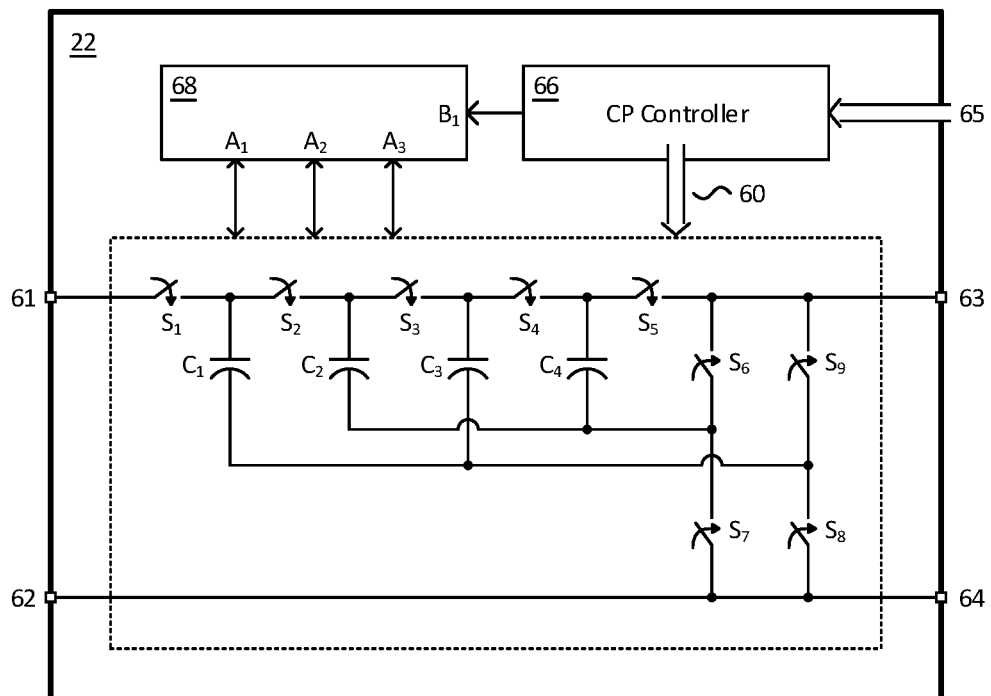
FIG. 6 shows details of a reconfigurable charge-pump from the power converter shown in FIG. 1.

FIG. 6 shows an example of a switched-capacitor circuit 22 for use in the uncontrolled power-converter 12 of FIG. 1.

The switched-capacitor circuit 22 is a single-phase step-up symmetric cascade multiplier having first, second, third, fourth, and fifth stack-switches $S_1$, $S_2$, $S_3$, $S_4$, $S_5$, and first, second, third, and fourth phase switches $S_6$, $S_7$, $S_8$, $S_9$ that cooperate to receive an input voltage across first and second switched-capacitor terminals 61, 62 and to produce an output voltage across third and fourth switched-capacitor terminals 63, 64.

There are four sets of switches: the first, third, and fifth stack-switches $S_1$, $S_3$, $S_5$ define a set of "odd stack-switches"; the second and fourth stack-switches $S_2$, $S_4$ define a set of "even stack-switches;" the first and third phase switches $S_6$, $S_8$ define a set of "even phase-switches" and the second and fourth phase-switches $S_7$, $S_9$ define a set of "odd phase-switches."

The switched-capacitor circuit 22 also includes first, second, third, and fourth capacitors $C_1$, $C_2$, $C_3$, $C_4$. Together with the switches, these define "stages" within the switched-capacitor circuit 22.

The illustrated switched-capacitor circuit 22 has four stages. Each stage includes one of the capacitors $C_1$, $C_2$, $C_3$, $C_4$ and one of four corresponding stack-switches $S_1$, $S_2$, $S_3$, $S_4$. The first stage includes the first stack-switch $S_1$ and the first capacitor $C_1$; the second stage includes the second stack-switch $S_2$ and the second capacitor $C_2$; the third stage includes the third stack-switch $S_3$ and the third capacitor $C_3$; and the fourth stage includes the fourth stack-switch $S_4$ and the fourth capacitor $C_4$. In the embodiment shown in FIG. 3, the maximum voltage-transformation ratio is five because there are four stages.

In response to receiving control signals on a switched-capacitor control terminal 65, a charge-pump controller 66 places operation control-signals on a control-signal path 60. These operation control-signals cause the first, second, third, fourth, and fifth stack-switches $S_1$, $S_2$, $S_3$, $S_4$, $S_5$ and the first, second, third, and fourth phase switches $S_6$, $S_7$, $S_8$, $S_9$ to change states according to a specific sequence. As a result, the switched-capacitor circuit 22 repeatedly transitions between first and second operating-states at a specific frequency.

For example, during a first operating-state, the charge-pump controller 66 closes the odd stack-switches $S_1$, $S_3$, $S_5$ and the odd phase-switches $S_7$, $S_9$ and opens the even stack-switches $S_2$, $S_4$ and the even phase switches $S_6$, $S_8$. In contrast, during a second operating-state, the charge-pump controller 66 opens the odd stack-switches $S_1$, $S_3$, $S_5$ and the odd phase-switches $S_7$, $S_9$ and closes the even stack-switches $S_2$, $S_4$ and the even phase-switches $S_6$, $S_8$.

In addition, the charge-pump controller 66 transmits reconfiguration control-signals to a reconfiguration input terminal B1 of a reconfiguration block 68. In response, the reconfiguration block 68 provides reconfiguration signals at its reconfiguration output terminals $A_1$-$A_3$. These reconfiguration signals alter the connections between the capacitors $C_1$-$C_4$ in the first and second operating-state.

The switched-capacitor circuit 22 has switches that open and close in the normal course of operation. The act of opening and closing these switches does not amount to changing the mode. The term "reconfiguration" expressly excludes the opening and closing of these switches during normal operation and is for the purpose of causing a selected voltage-transformation ratio.

The ability to reconfigure the connections between the capacitors $C_1$-$C_4$ is particularly advantageous because it means that the same circuitry can be used to implement different voltage-transformation ratios. However, this ability comes at a cost. In particular, when the reconfiguration block 68 reconfigures the connections, it also changes the control system's forward transfer-function. Such a change can be manifested as a change in the forward transfer-function's gain, a change in its distribution of its poles and zeros in the complex-frequency domain, or both.

Other examples of charge pumps include Ladder, Dickson, Series-Parallel, Fibonacci, and Doubler, all of which can be adiabatically charged and configured into multi-phase or single-phase networks. A particularly useful charge pump is an adiabatically charged version of a full-wave cascade multiplier. However, diabatically charged versions can also be used.

As used herein, changing the charge on a capacitor "adiabatically" means causing at least some of the charge stored in that capacitor to change by passing it through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switched-capacitor circuit is a switched-capacitor circuit having at least one capacitor that is both adiabatically charged and adiabatically discharged. A diabatically charged switched-capacitor circuit is a switched-capacitor circuit that is not an adiabatically charged switched-capacitor circuit.

Referring back to FIG. 1, an external compensation circuit 18 receives the output voltage VOUT as a feedback signal and transforms it into a first compensation voltage VCOMP. An internal compensation circuit 26 compares this first compensation voltage VCOMP with a reference voltage VREF.

The external compensation circuit 18 is typically provided by the end user based on the particular details of the application. However, as can be seen in FIG. 1, the external compensation circuit 18 has no way to know if reconfiguration has occurred. As such, the external compensation circuit 18 would have no way to compensate for any changes to the system transfer function that would be wrought by such reconfiguration.

The internal compensation circuit 26, on the other hand, is an integral part of the uncontrolled power-converter 12. The internal compensation circuit 26 is regarded as "internal" because it is ordinarily on the same semiconductor die as one or more other components of the uncontrolled power-converter 12. In contrast, the external compensation circuit 18 would connect to but be external to such a semiconductor die.

As such, it receives a signal indicative of a reconfiguration event and compensates for changes to the system transfer function that result, whether the change manifests itself as a change in the transfer function's gain or a change in its distribution of its poles and zeros. This relieves the end user from having to know when the switched-capacitor circuit has been reconfigured.

Based on this comparison between the compensation voltage VCOMP with a reference voltage VREF, the internal compensation circuit 26 outputs a second compensation voltage VCOMP2.

Accordingly, the external compensation circuit 18 and the internal compensation circuit 26 define a multi-stage compensation circuit that cooperate to stabilize the overall control system.

In the illustrated embodiment, reconfiguration logic 24 provides the reference voltage VREF. However, it is also possible to provide the reference voltage VREF from an external source.

Referring now to FIG. 7, the external compensation circuit 18 transforms the output voltage VOUT, which can be relatively high, into a lower first compensation voltage VCOMP. Having a lower compensation voltage avoids having to provide circuitry within the internal compensation circuit 26 that would be required to sustain high voltages.

To accomplish this, the external compensation circuit 18 features a voltage divider having first and second resistors RD1, RD2 that define a node to which the internal compensation circuit 26 can be connected to receive the first compensation voltage VCOMP.

The external compensation circuit 18 also features a reactive path in parallel with the first resistor RD1. In the illustrated embodiment, the reactive path features a reactive-path resistor RPO and a reactive-path capacitor CZO in series. By choosing the values of the reactive path's resistance and capacitance, it is possible to modify the system transfer function by introducing a pole and a zero at a particular location in the complex plane.

FIGS. 8 and 9 show two embodiments of the internal compensation circuit 26.

In the first embodiment, shown in FIG. 8, an operational amplifier 27 receives the first compensation voltage VCOMP and the reference voltage VREF at its inverting and non-inverting inputs respectively. This causes the second compensation voltage VCOMP2 at the operational amplifier's output. An optional feedback path between the operational amplifier's output and its inverting input includes a feedback resistor RZ2 and a feedback capacitor CP2. These introduce a pole and a zero into the system transfer function. By choosing the resistance of the feedback resistor RZ2 and/or the feedback capacitor CP2, it is possible to control the location of the pole and zero in the complex-frequency domain.

In the second embodiment, shown in FIG. 9, an operational transimpedance amplifier 27 receives the first compensation voltage VCOMP and the reference voltage VREF at its inverting and non-inverting inputs respectively. This causes the second compensation voltage VCOMP2 at the operational transimpedance amplifier's output. An optional shunt path between the operational transimpedance amplifier's output and ground includes a shunt resistor RZ1 and a shunt capacitor CP1. These introduce a pole and a zero into the system transfer function. By choosing the resistance of the shunt resistor RZ1 and/or the shunt capacitor CP1, it is possible to control the location of the pole and zero in the complex-frequency domain.

Referring back to FIG. 1, a modulator 28 receives the second compensation voltage VCOMP2 and uses it to generate a duty-cycle signal D that is then passed to the switched-inductor controller 40 through the switched-inductor circuit's control terminal 45. The switched-inductor controller 40 uses this duty-cycle signal D as a basis for controlling the duty cycle of the regulator-switch 46 in the switched-inductor circuit 20.

In some embodiments, the reconfiguration logic 24 uses the input voltage VIN and the desired output voltage VREF to output a nominal duty-cycle signal DO. In these embodiments, the second compensation voltage VCOMP2 causes the modulator 28 to modify the nominal duty-cycle signal DO to generate the duty-cycle signal D. In those embodiments in which the circuitry that generates the forward transfer-function is reconfigurable, the nominal duty-cycle signal DO depends on configuration and may therefore change upon reconfiguration of that circuitry. For example, in those embodiments in which the voltage-transformation ratio of the switched-capacitor circuit can be changed, the nominal duty-cycle signal DO will change in a corresponding manner.

The duty-cycle signal D affects the duty cycle, and hence the current passing out of the switched-inductor circuit 20. In general, this current increases with duty cycle. However, the relationship between duty cycle and current depends on the details of the switched-inductor circuit 20. The net result in either case is that the output voltage VOUT tracks the reference voltage VREF.

The feedback loop is designed to achieve certain desired operational characteristics of the controlled power-converter 17. These can include capping the steady-state difference between the output voltage VOUT and the reference voltage VREF as well as the dynamic response of the output voltage VOUT to disturbances, such as step changes or oscillations at various frequencies in either the input or output currents. Of particular importance is that the feedback loop be configured to ensure that the output voltage VOUT tracks the reference voltage VREF.

The external compensation circuit 18 is not necessarily required for operation of the power converter. In some cases, there is a direct connection so that the output voltage VOUT is equal to the compensation voltage VCOMP. In this scenario, the resistors and reactive elements can be moved from the external compensator circuit 18 to the internal compensation circuit 26.

Among those configurations that use feedback are those in which the external compensation circuit 18 implements a low-pass filter having a long time-constant. This promotes stability of the overall feedback-controlled power-converter 17.

Other configurations that use feedback have an external compensation circuit 18 that provides desired response to perturbations, such as rapid changes in load current, that may result in corresponding rapid changes in the output voltage VOUT.

The compensation voltage depends on the feedback transfer-function, which itself assumes a particular forward transfer-function. If the forward transfer-function changes, then the compensation voltage will change.

Figure 10:
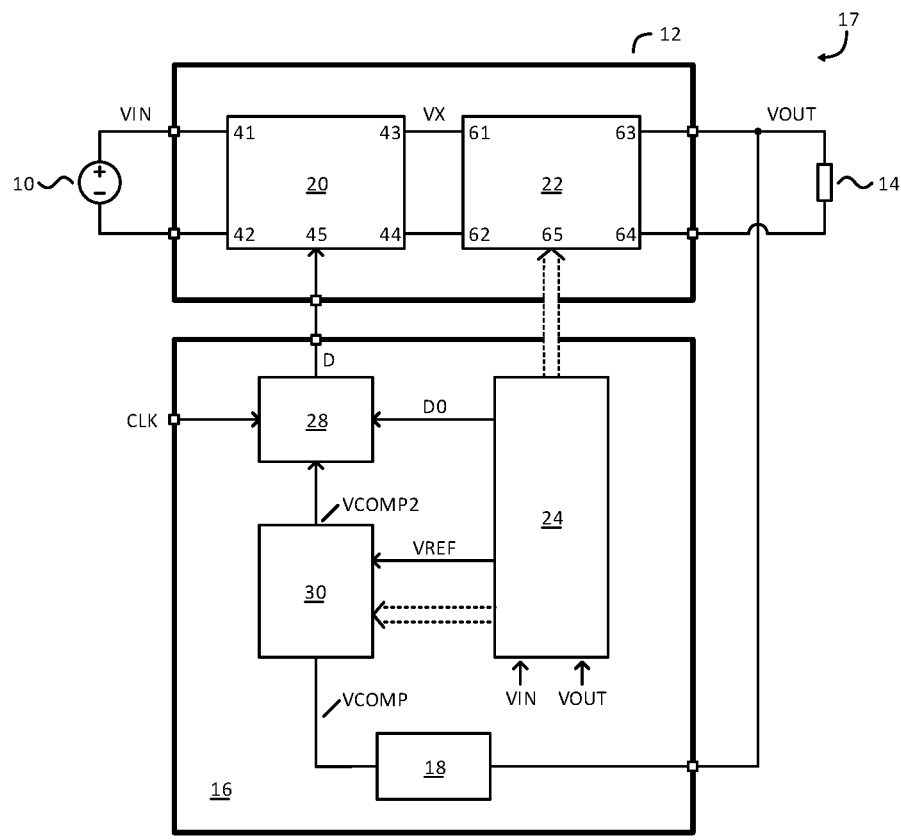
FIG. 10 shows another control system for controlling the otherwise uncontrolled step-up power converter shown in FIG. 1.

FIG. 10 shows a power converter similar to that shown in FIG. 1 but with the reconfiguration logic 24 also having the ability to reconfigure the switched-capacitor circuit 22 in response to the input and output voltages VIN, VOUT of the power converter. Such reconfiguration has the effect of changing the voltage-transformation ratio, which in turn changes the forward-path transfer function.

The change in the forward-path transfer function changes the overall dynamics of the controlled power-converter 17. These changes may affect the response of the output voltage VOUT to variations in the input voltage VIN or the output current IOUT. Thus, if the external compensation circuit 18 were designed for use with a first configuration of the switched-capacitor circuit 22, it would be quite possible that it would no longer work as expected when the switched-capacitor circuit 22 assumes its second configuration.

To accommodate this difficulty, the controlled power-converter 17 also features a reconfigurable internal compensation circuit 30 that receives a first compensation voltage VCOMP from the external compensation circuit 18 and transforms it into a second compensation voltage VCOMP2 that depends on the configuration of the switched-capacitor circuit 22. Thus, when the reconfiguration block 68 in FIG. 6 reconfigures the switched-capacitor circuit 22, the reconfiguration logic 24 also reconfigures the reconfigurable internal compensation circuit 30. The combination of the reconfigurable internal compensation circuit 30 and the external compensation circuit 18, when present, can be viewed as an adaptive compensation circuit that dynamically responds to reconfiguration events within the circuitry that generates the forward transfer-function.

The reconfigurable internal compensation circuit 30 compensates for some or all of the changes in the forward transfer-function. In particular, the reconfigurable internal compensation circuit 30 causes the overall forward transfer-function to appear to stay the same, even though the reconfiguration block 68 may have reconfigured the switched-capacitor circuit 22. In a case where the feedback control is based on linear transfer functions, which can be characterized by their Laplace transforms, this can be achieved by ensuring that the product of the Laplace transform of the uncontrolled power-converter's transfer function, which is the combined transfer functions of the switched inductor-circuit 20 and the switched-capacitor circuit 22, and the Laplace transform of the feedback control-system 16 remain constant.

In some embodiments, this can be carried out by moving poles and/or zeros of the switched-capacitor circuit's transfer function in the complex-frequency domain with corresponding poles and/or zeros of the reconfigurable compensator's transfer function. However, in cases where this is difficult to execute, it is possible to provide heuristic rules for moving the poles and/or zeros of the reconfigurable compensator's transfer function. For example, if the switched-capacitor circuit's voltage-transformation ratio increases, then an output double-pole will typically move to a lower frequency. To compensate for this, the reconfiguration logic 24 will reconfigure the reconfigurable internal compensation circuit 30 to have its zeros at a lower frequency as well.

In this embodiment, the reconfiguration logic 24 changes the location of the zeros of the reconfigurable internal compensation circuit 30 in steps. As an example, a reconfigurable internal compensation circuit 30 may be configured to move its zeros in steps of 50 kHz. In that case, the uncontrolled power-converter 12 may begin operating with a double pole at 100 kHz, in which case the reconfigurable internal compensation circuit 30 would be set to have a zero at 100 kHz. However, if upon reconfiguration the uncontrolled power-converter 12 now has a pole at 30 kHz, it is not possible for the reconfigurable internal compensation circuit 30 to place a corresponding zero at 30 kHz. In that case, the reconfigurable internal compensation circuit 30 would do the best it can by placing a zero at the closest permissible location in frequency space, namely at 50 kHz.

Figure 11:
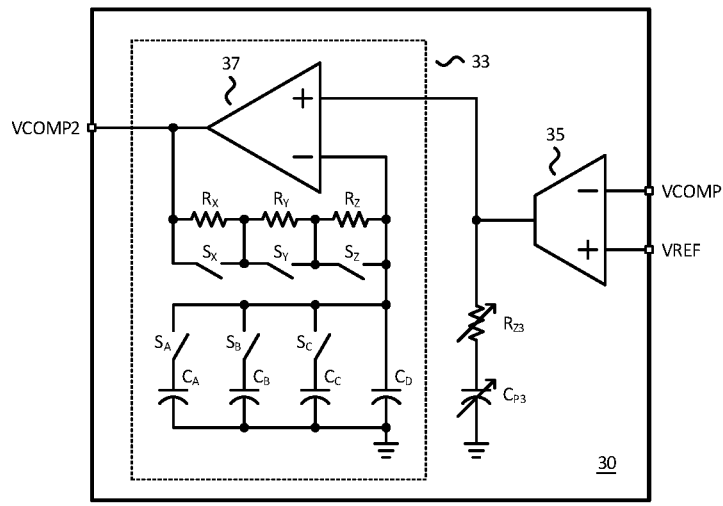
FIG. 11 shows an internal compensation circuit from the control system shown in FIG. 10.

Referring to FIG. 11, the reconfigurable internal compensation circuit 30 includes an operational transimpedance amplifier ("OTA") 35 that receives the first compensation voltage VCOMP and the reference voltage VREF at its inverting and non-inverting inputs respectively. An optional shunt path between the operational transimpedance amplifier's output and ground includes a shunt resistor RZ3 and a shunt capacitor CP3. These introduce a pole and a zero into the system transfer function, the location of which depends on the choice of resistance and capacitance. To provide the flexibility of moving poles and zeroes it is possible for one or both of the shunt resistor RZ3 and the shunt capacitor CP3 to present a variable electrical parameter. In the illustrated embodiment, the shunt resistor RZ3 has a variable resistance and the shunt capacitor CP3 has a variable capacitance. There are numerous ways to electrically control the resistance of the shunt resistor RZ3 and the capacitance of the shunt capacitor CP3.

The output of the operational transimpedance amplifier 35 is not used as the second compensation voltage VCOMP2, as was the case in FIG. 9. Instead, it is passed into an optional reconfigurable active zero circuit 33.

The reconfigurable active zero circuit 33 is a network of resistive elements $R_X$, $R_Y$, $R_Z$, and reactive elements $C_A$, $C_B$, $C_C$, $C_D$ interconnected by switches $S_A$, $S_B$, $S_C$, $S_X$, $S_Y$, $S_Z$. By selectively opening and closing combinations of switches, it is possible to move the zero location, thereby compensating for the movement of poles and zeroes upon reconfiguration of the switched-capacitor circuit 22.

In some embodiments, the capacitors $C_A$, $C_D$, $C_C$, $C_D$ have equal capacitances and the resistors $R_X$, $R_Y$, $R_Z$ have equal resistances. But this is by no means required. In addition, there is no particular constraint on how many capacitors and resistors are present. The choice of values and numbers depends primarily on how many states the switched-capacitor circuit 22 is reconfigurable into and where the poles and zeroes introduced by such reconfigurations will be in the complex plane.

The reconfiguration logic 24 further includes logic for choosing which of the switches $S_A$, $S_B$, $S_C$, $S_X$, $S_Y$, $S_Z$ to open and close to achieve the required compensation in response to the switched-capacitor circuit's reconfiguration. The choice is such that the uncontrolled power-converter 12 presents a nominal forward transfer-function. This nominal forward transfer-function is less dependent on the switched-capacitor circuit's reconfiguration than it would have been in the absence of the reconfigurable internal compensation circuit 30.

As a result of always presenting the same nominal transfer function, it is not necessary to reconfigure the external compensation circuit 18 to accommodate reconfiguration of the switched-capacitor circuit 22. This means that the switched-capacitor circuit 22 is able to change its voltage-transformation ratio in a relatively seamless way, at least as seen from outside the power converter 10. The reconfigurable internal compensation circuit 30 thus makes the overall transfer-function less dependent on any reconfiguration of the switched-capacitor circuit 22 than it would be if the reconfigurable internal compensation circuit 30 were not present. More generally, the reconfigurable internal compensation circuit 30 renders the overall transfer-function less dependent on any reconfiguration of any portion of the circuitry that is responsible for changing the forward transfer-function than it would be if the reconfigurable internal compensation circuit 30 were not present.

In some embodiments, the reactive elements are capacitors. It is possible that the resistive and reactive elements are small enough so that the reconfigurable internal compensation circuit 30, the switched-capacitor circuit 22, and the reconfiguration logic 24 are on the same semiconductor die. The external compensation circuit 18 can be on a different die and/or created using external components such as multilayer ceramic capacitors (MLCCs) and chip resistors.

Figure 12:
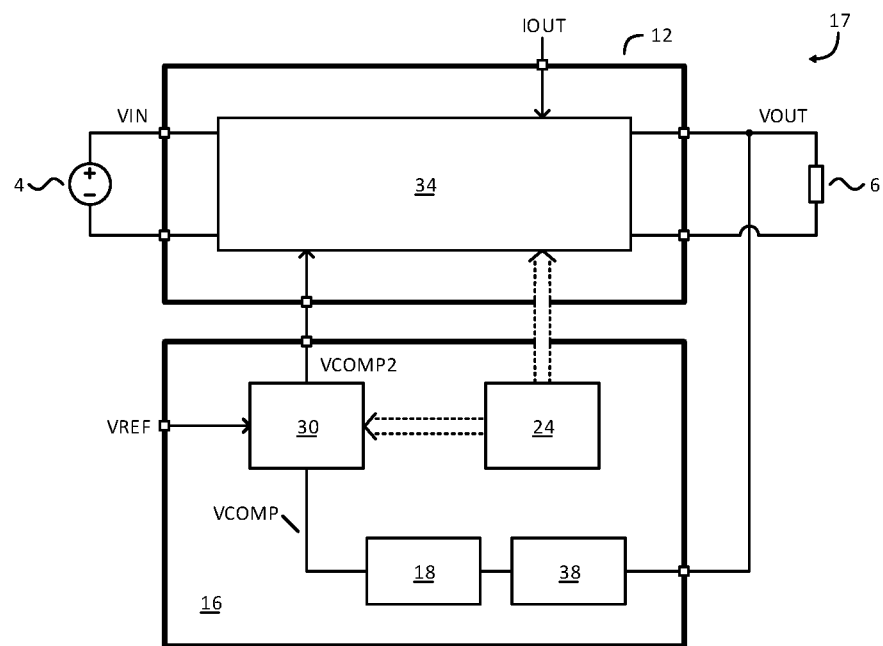
FIG. 12 shows a diagram of a control system having a two-part internal compensation circuit.

In FIG. 12, the modulator 28, the switched-inductor circuit 20, and the switched-capacitor circuit 22 have been combined to form a switched regulator 34. As indicated by the dashed arrows, the reconfiguration logic 24 reconfigures both the switched regulator 34 and the reconfigurable internal compensation circuit 30.

In the embodiment shown, the output of the switched regulator 34 is the output voltage VOUT. The inputs to the switched regulator 34 are the second compensation voltage VCOMP2, the input voltage VIN, and the output current IOUT. The second compensation voltage VCOMP2 is a function of the first compensation voltage VCOMP, an input reference voltage VREF, and/or other values.

For a particular configuration of the reconfigurable internal compensation circuit 30, the design of the external compensation circuit 18 depends on a loop transfer function of a loop that begins with the switched regulator 34, proceeds through an additional internal compensation circuit 38.

The additional internal compensation circuit 38 typically includes circuitry for introducing poles and zeros into the transfer function. In some embodiments, the poles and zeros are fixed. In other embodiments, the poles and zeros are reconfigurable. In either case, the external compensation circuit 18 receives the output of the additional internal compensation circuit 38.

In some embodiments, the external compensation circuit 18 includes a voltage divider as shown in FIG. 7. However, in other embodiments, the additional internal compensator circuit 38 includes such a voltage divider instead.

The reconfigurable internal compensation circuit 30 receives this reduced voltage VCOMP and proceeds to dynamically introduce additional poles and zeros as discussed in connection with FIG. 9 or 11.

The design of the external compensation circuit 18 relies on the gain and phase margins of the loop transfer function. The gain and phase of the loop-transfer function are, in general, functions of frequency. In general, there will exist a frequency at which the phase is equal to 180 degrees relative to a reference. At that frequency, there will also be a corresponding gain. The extent to which this corresponding gain is less than unity, measured in dB, is the "gain margin."

Conversely, since the gain and phase both depend on frequency, there will be a frequency at which the gain is unity. The corresponding phase at that frequency is what determines phase margin. In particular, the phase margin is the extent to which that corresponding phase falls short of 180 degrees.

In some examples, the gain and phase response of the feedback control system 16 are modeled as small signals that are susceptible to linearized analysis around an operating point of the switched regulator 34.

In some cases, the task of compensating for linear and non-linear properties of the feedback control system 16 is split between the reconfigurable internal compensation circuit 30 and the external compensation circuit 18. In some embodiments, the reconfigurable internal compensation circuit 30 compensates for the linear component of the overall transfer function whereas the external compensation circuit 18 compensates for the non-linear component and vice versa.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a non-abstract database representative of the system may be a database or other data structure that can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described the invention, and a preferred embodiment thereof, what is claimed as new and secured by Letters Patent is:

1. An apparatus comprising:
   a controller to generate one or more control signals; and a compensator to compensate for a change in a gain of a power converter based, at least in part, on the one or more control signals, the gain is to be based, at least in part, on a transition between a first and a second power converter configurations, wherein the compensator to comprise a first compensation circuit to compensate for one or more linear properties of a change in at least one transfer function of the power converter, the first compensation circuit to receive a voltage from a second compensation circuit, the second compensation circuit to compensate for one or more non-linear properties of the change.

2. The apparatus of claim 1, wherein the first compensation circuit is an internal compensation circuit, and the second compensation circuit is an external compensation circuit.

3. The apparatus of claim 1, wherein the first compensation circuit is an external compensation circuit, and the second compensation circuit is an internal compensation circuit.

4. The apparatus of claim 1, wherein the power converter to include at least a charge pump and a regulator to be coupled to the charge pump.

5. The apparatus of claim 4, wherein the first and the second power converter configurations to comprise configurations with respect to the charge pump and/or the regulator.

6. The apparatus of claim 1, wherein the at least one transfer function to comprise at least one forward transfer function.

7. The apparatus of claim 1, wherein the first and the second power converter configurations to correspond to a first and a second voltage transformation ratios, and
the first and the second voltage transformation ratios to be different from each other.

8. The apparatus of claim 1, wherein the power converter to comprise a buck-boost power converter.

9. The apparatus of claim 1, wherein the at least one transfer function to include a compensator transfer function, a zero of the compensator transfer function to move in frequency steps to be based, at least in part, on the transition between the first and the second power converter configurations.

10. The apparatus of claim 9, wherein the second power converter configuration to include a transfer function with a pole that is to change frequency, and wherein the compensator transfer function to include a zero that is to chase the pole in an associated frequency space.

11. The apparatus of claim 9, wherein the second power converter configuration to include a transfer function with a pole to include a pole frequency, wherein the second power converter configuration to include a compensator configuration to define a gap between a zero frequency corresponding to the compensator configuration and the pole frequency, the zero frequency to correspond to a frequency of a zero to be associated with the compensator configuration.

12. The apparatus of claim 11, wherein the compensator configuration to further define a set of gaps, a particular gap of the set of gaps to correspond to a difference between the pole frequency and a zero frequency of at least one of the compensator configuration, and wherein the compensator transfer function to have a zero so as to minimize a gap between the zero and the pole in an associated frequency space.

13. The apparatus of claim 9, wherein the second power converter configuration to include a transfer function with a pole that is to change frequency, and wherein the compensator transfer function to include a zero to have the same frequency as the pole.

14. The apparatus of claim 1, wherein the at least one transfer function to include at least a charge pump transfer function and a compensator transfer function, wherein, with the power converter in the second power converter configuration, a double pole of the charge pump transfer function to move to a lower frequency.

15. The apparatus of claim 14, wherein the compensator to lower a zero frequency of the compensator transfer function based, at least in part, on the move of the double pole of the charge pump to the lower frequency.

16. The apparatus of claim 1, wherein the compensator to compensate for the change in the gain to include a compensation in a change in a distribution of poles and/or zeros in a frequency domain of the at least one transfer function to occur based, at least in part, on the transition between the first and the second power converter configurations.

17. An apparatus comprising:
a controller to generate one or more control signals; and
a compensator to compensate for a change in a gain of a power converter based, at least in part, on the one or more control signals, the gain is to be based, at least in part, on a transition between a first and a second power converter configurations,
wherein the change in the gain to include a change in at least one transfer function of the power converter,
wherein the at least one transfer function to include at least a charge pump transfer function and a compensator transfer function, wherein, with the power converter in the second power converter configuration, a double pole of the charge pump transfer function to move to a lower frequency, and
wherein the compensator to lower a zero frequency of the compensator transfer function based, at least in part, on the move of the double pole of the charge pump to the lower frequency.

18. The apparatus of claim 17, wherein the compensator to lower the zero frequency of the compensator transfer function in steps.

19. An apparatus comprising:
a controller to generate one or more control signals; and
a compensator to compensate for a change in a gain of a power converter based, at least in part, on the one or more control signals,
wherein the change in the gain to include a change in at least one transfer function of the power converter,
wherein the compensator to comprise an internal compensation circuit and an external compensation circuit to be coupled to the internal compensation circuit, the internal compensation circuit to receive a voltage from the external compensation circuit, and wherein the compensation for the change in the gain to be split between the internal compensation circuit and the external compensation circuit, the internal compensation circuit to compensate for one or more linear properties of the at least one transfer function and the external compensation circuit to compensate for one or more non-linear properties of the at least one transfer function,
wherein the first and the second power converter configurations to correspond to a first and a second voltage transformation ratios, and
the first and the second voltage transformation ratios to be different from each other.

20. The apparatus of claim 19, wherein the internal compensation circuit is formed in the same semiconductor die as the power converter.

\* \* \* \* \*

UNITED STATES PATENT AND TRADEMARK OFFICE
CERTIFICATE OF CORRECTION

| | |
|---|---|
| PATENT NO. | : 12,003,174 B2 |
| APPLICATION NO. | : 18/152838 |
| DATED | : June 4, 2024 |
| INVENTOR(S) | : Gregory Szczeszynski |

It is certified that error appears in the above-identified patent and that said Letters Patent is hereby corrected as shown below:

In the Specification

In the CROSS-REFERENCE TO RELATED APPLICATION:

Column 1, Line 7, change "application Ser. No." to --Application No.--.

Column 1, Line 10, change "application Ser. No." to --Application No.--.

Signed and Sealed this
Thirtieth Day of July, 2024

Katherine Kelly Vidal
*Director of the United States Patent and Trademark Office*